Aug. 31, 1937.   N. FERRAEZ, JR   2,091,810
APPARATUS FOR CATCHING LIQUID SAMPLES
Filed July 29, 1932   2 Sheets-Sheet 2

Inventor:
Nicolas Ferraez Jr.
By Herbert G. Fletcher
atty.

Patented Aug. 31, 1937

2,091,810

UNITED STATES PATENT OFFICE 2,091,810

APPARATUS FOR CATCHING LIQUID SAMPLES

Nicolas Ferraez, Jr., Highland, Ill.

Application July 29, 1932, Serial No. 625,577

5 Claims. (Cl. 73—21)

This invention relates to certain new and useful improvements in an apparatus for testing and sampling liquids and is a furthering of the improvements disclosed in my co-pending application for the improvements in a system and apparatus for collecting and testing sediments of liquids, now Patent 2,055,252. The present application however disclosing improvements over my prior application which includes an improved and simplified entraining system for entraining the liquid which is to be tested and in addition includes an attachment for catching and retaining a sample of the liquid for grading purposes.

The primary object of the invention is in providing a sample collecting attachment in the system or apparatus which is acted on and operated simultaneous with the entraining of the liquid body which is to be tested for sediments.

Another object of the invention is in providing an improved operating apparatus which may be made cooperable with a sediment testing container.

Other and further objects will appear in the specification and be specifically pointed out in the appended claims, reference being had to the accompanying drawings, exemplifying the invention, and in which:—

Figure 1:
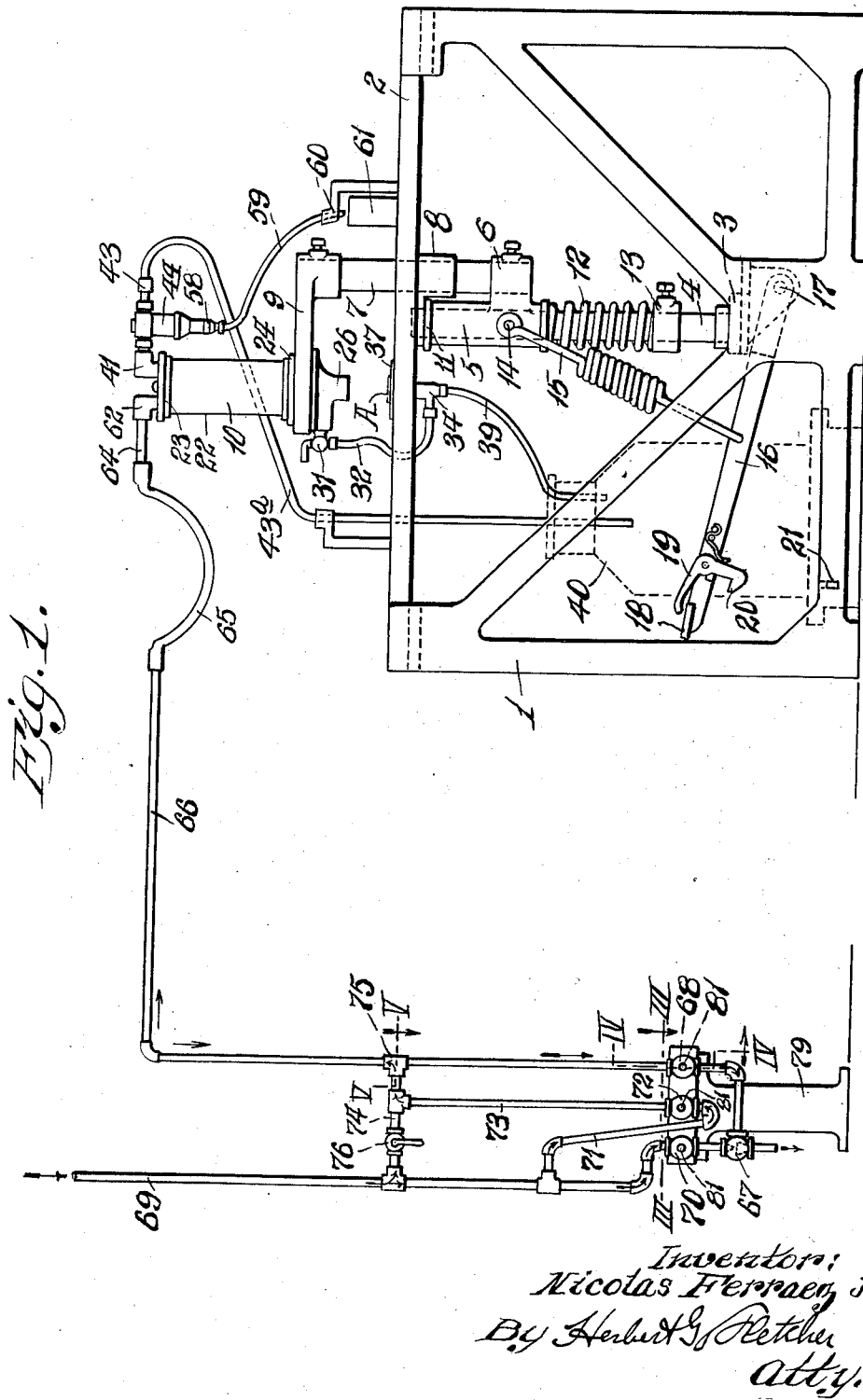
Figure 1 is a side elevation of the apparatus used in carrying out the invention.
Figure 2:
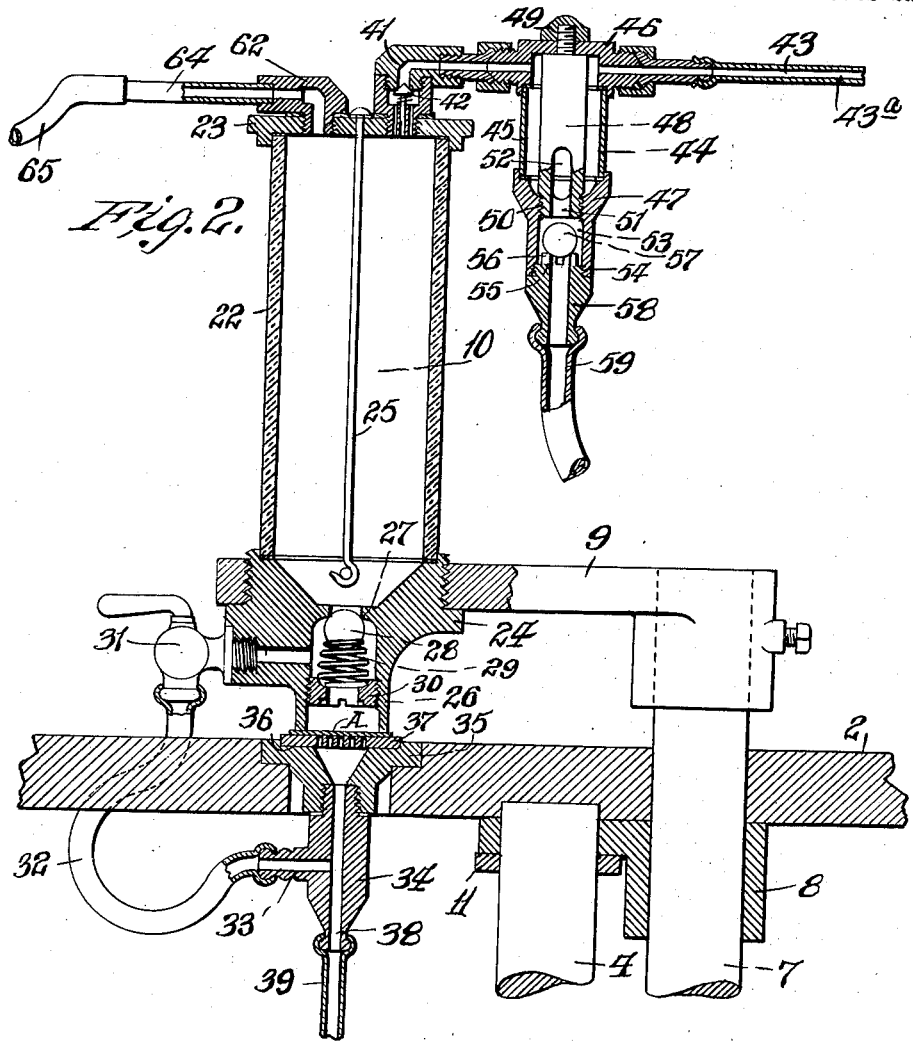
Figure 2 is an enlarged vertical longitudinal fragmentary sectional elevation of a portion of Fig. 1, through the sediment testing and sample collecting devices.

In the accompanying drawings, 1 designates a frame supporting a table 2 and mounted in the frame is a cross member 3 and vertically secured between said cross member and the under side of the table 2 is a stationarily held guide rod 4. Slidable on the rod 4 is a cross-head 5 having a side extension 6 and fixed to said side extension is an extension rod 7 which passes upwardly through the table 2 and is slidable in the guide 8 which is secured to the under side of the table. Fixed to the upper end of the rod 7 above the table 2 is an arm 9, said arm being for the support of the liquid testing container 10.

The cross-head 5 is normally held at the upper end of the guide rod 4 in abutment with the rubber bumper 11 by the coil spring 12 which underengages the cross-head, said spring being held in position on the guide rod by the set collar 13. Laterally extending from the cross-head 5 is a pin 14 and connected on said pin is a spring-link 15 which is secured at its lower end to the foot lever 16 which is fulcrumed at 17 to the frame 1, said lever adjacent its foot engaging end 18 bearing a spring-held latch 19, said latch having a catching portion 20 which is adapted to underengage the transverse bar 21 of the frame 1.

The liquid testing container 10 comprises a tubular glass cylinder 22 which is closed at its upper end by the head 23 and at its lower end by the head 24, the head 24 being threadingly secured in the arm 9 and the cylinder 22 being secured between the heads 23 and 24 by the tie rod 25 which connects said heads. The cylinder head 24 is provided with a spout end 26 and formed therein is a valve seat 27 for a ball check 28, said ball check being held against said seat by the spring 29 which is held in position by the internal nut 30. Secured to one side of the spout 26 and in connection therewith is an angle valve 31 and connected with the depending end thereof is a hose length 32 which connects with the branch 33 of the hose nozzle 34.

The nozzle 34 is secured to and depended from a disc supporting socket 35, said socket being seated in the table 2 and having a countersunk part 36 in which a perforated metallic disc 37 is mounted.

The nozzle 34 is provided with a branch 38 to which a discharge hose length 39 is connected, said hose length 39 being entrained to a receptacle 40 which may be disposed beneath the table 2.

The head 23 of the cylinder 22 of the container 10 is provided with a valve housing 41, said housing providing communication to the cylinder and located in said housing is an outlet check valve 42 and communicating with said valve housing 41 is a liquid supply line 43 and disposed in said supply line in proximity to the valve housing 41 is a sample retaining device 44.

The device 44 comprises a glass cylinder 45 which is retained by upper and lower heads 46 and 47 respectively by an interiorly disposed vertical member 48 which is secured to the head 46 by the clamping nut 49 and said member 48 having threaded engagement at 50 to the lower head 47. The member 48 at its threaded end is provided with a bore 51 and a transverse opening 52 in communication with the bore 51. The lower head 47 of the device 44 is provided with a bore 53 having interior threads 54 at its lower end and a valve seat 55 secured in the threads 54 having upwardly extending projections 56 for normally sustaining a ball check 57 which is mounted in the bore 53 of the head 47.

The valve seat 55 forms a part of a nozzle 58, the passageway of said nozzle extending through the valve seat and attached to said nozzle is a hose length 59 which is secured at its depending end to a holder 60 which is supported by the table 2, the depending end of the hose length 59 being disposed above a receptacle 61 mounted on the table 2.

The cylinder head 23 of the container 10 is also provided with a communicating elbow 62 and connected with said elbow is a pipe nipple 64 and connected to the extending end of said nipple is a hose length 65 which is connected at its other end with a pipe line 66, said pipe line at its other end connecting with an ejector 67 and in said pipe line is a control valve 68.

Leading to and connecting with the ejector 67 is an air pressure supply pipe 69 and in said pipe forwardly of the ejector 67 is a control valve 70, the control valve 68 of the pipe line 66 being disposed in said pipe line forwardly of the ejector 67. Connected with the pipe 69 forwardly of the control valve 70 thereof is a branch pipe 71 which leads to and connects with a control valve 72 and extending from said valve is a pipe 73 which communicates with a pipe 74 which connects the pipe line 66 and the supply pipe 69, said pipe 74 being connected to the pipe line 66 by the T-fitting 75 and disposed in said pipe 74 between the pipes 69 and 73, is a hand operative valve 76.

Figures 3, 4, 5:
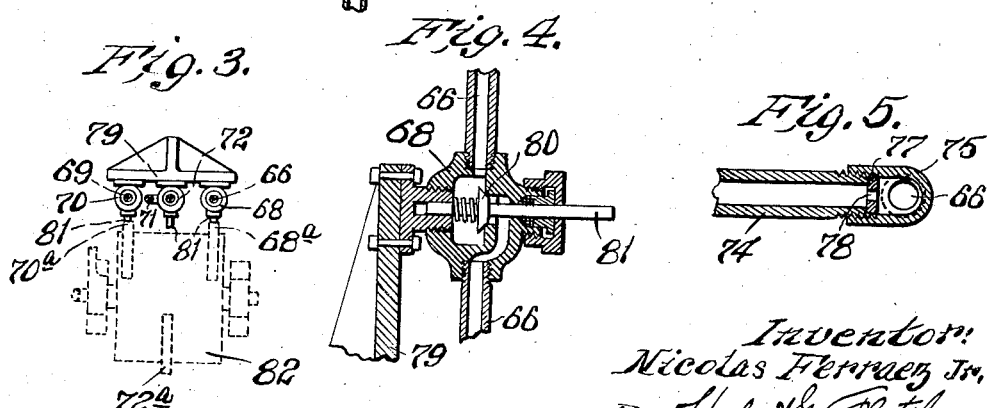
Figure 3 is a horizontal section taken approximately on the line III—III of Fig. 1.
Figure 4 is an enlarged fragmentary vertical section taken approximately on the line IV—IV of Fig. 1.
Figure 5 is an enlarged fragmentary horizontal section taken approximately on the line V—V of Fig. 1.

The T-fitting 75 is provided with an interiorly disposed partition 77 having an aperture 78 formed therein, said partition being mounted in the T-fitting when the pipe 74 is connected to the fitting, the partition 77 being held in position in the T-fitting by abutment of the end of the pipe 74 therewith (Fig. 5). The aperture 78 provides for communication between the pipe 74 and the T-fitting or pipe line 66.

The control valves 68, 70 and 72 are mounted in horizontal alinement on the supporting standard 79 as shown in Fig. 1, said valves being uniform in their construction and comprising a spring actuated valve 80, each having a protruding valve stem 81 as shown in Fig. 4, said valve stems adapted to be cyclically operated by respective cam surfaces 68a, 70a and 72a respectively of the revoluble member 82 (see Fig. 3) in the manner described in my co-pending application aforesaid.

In the operation of this improved apparatus, a sediment test disc A is placed on the perforated metallic disc 37 and the container 10 is lowered by the operator pressing the lever 16 down until the catching portion 20 of the latch 19 underengages the bar 21 of the frame 1, this lowering operation causing the spring link 15 to move the cross head 5 against the pressure of the coil spring 12, and the cross head drawing the rod 7 and container 10 downward for tightly engaging the mouth of the spout 26 of the container against the sediment test disc A.

A source of air pressure from which the supply pipe 69 leads is maintained and the member 82 is revolved and the cam surfaces 68a and 70a on account of them being similarly positioned on the member 82 and forwardly of the cam surface 72a, will simultaneously engage respective valve stems 81 of the control valves 68 and 70. The opening of the valve 80 of the control valve 70 will permit compressed air to be discharged from the pipe 69 through the ejector 67, the operating of the ejector simultaneously creating a suction in the pipe line 66.

The suction created in the pipe line 66 will move the valve 42 of the valve housing 41 from its seat, thus creating a partial vacuum in the container 10 and the liquid supply line 43 in which the device 44 is located. The supply line 43 is provided with an extending flexible hose 43a, to be engaged in a body of liquid such as milk to be tested and contained in the receptacle 40 for the entrainment of a part of the milk from the container 10. As the member 82 is revolved, obviously the cam surfaces 68a and 70a will ride away from the valve stems 81 with which they have been cooperating thus permitting the valves 80 of the control valves 68 and 70 to be spring pressed into closed position, this closing of the valves occurring when the container 10 is approximately filled with the liquid or milk, as pre-determined by the time length of dwell or engagement of the cam surfaces 68a and 70a against the valve stems 81 of the control valves 68 and 70, and so that the container 10 will not fill to overflowing into the pipe line 66.

As the member 82 continues to revolve towards the completion of a one revolution cycle, the cam surface 72a will engage the valve stem 81 of the control valve 72 thus opening said valve and permitting air pressure to be entrained from the supply pipe 69, through the pipe 71 and the continuing pipe 73, through the pipe 74 to the pipe line 66 into the container 10 on top of the entrained liquid in said container, the air pressure on the liquid in the container forcing the ball check 28 from its seat 27 and discharging the liquid through the nozzle 26 and the sediment test disc A, the sediment test disc retaining sediments of the liquid as the liquid is forced therethrough to discharge through the nozzle 34 and hose length 39, back into the receptacle 40.

During the time the suction was created in the pipe line 66, the partial vacuum formed in the container 10 and retaining device 44 obviously caused the respective ball check valves 28 and 57 of the container 10 and device 44 to be held in closed positions for maintaining the partial vacuum in said container and said device and consequently, both the container 10 and the device 44 became filled with the liquid entrained through the supply line 43 and immediately upon suction being discontinued in the pipe line 66, the ball check valve 57 of the device 44 simultaneously dropped by gravity, from its closed position with the bore 51 of the member 48 on to the projections 56 of the valve seat 55, thereby permitting the liquid in the cylinder 45 of the device 44 to be detrained therefrom through the nozzle 58 and the hose length 59 where it was received by the receptacle 61 on the table 2.

After the liquid has been entrained into the container 10 and the device 44 and subsequently discharged therefrom, the operator will swing the latch 19 of the lever 16 for disengaging the catching portion 20 of said latch from engagement with the bar 21 and upon release of the lever 16 by the operator, the coil spring 12 will force the cross head 5 upwardly, thereby elevating the container 10 to the position shown in Fig. 1 for permitting removal of the test disc A for examination purposes for determining the foreign matters which may be present in the sediment collected in the disc.

The elevating of the container 10 also provides accessibility for the placing of other sediment collecting discs on the perforated disc 37 for carrying on subsequent disc tests.

The revoluble member 82 having the cam surfaces 68a, 70a and 72a is adapted to be stopped after each revolution in a manner similar as shown and described in my pending application aforesaid as but one revolution of the member 82 is required for carrying out the operation of entraining and expelling the liquid to be tested, to and from the container 10 and the sample collecting device 44.

In addition to collecting the sediment from the liquid by forcing it through the disc A, additional testing is made by the use of the sample retaining or collecting device 44 which collects a portion of the liquid at the time the container 10 was supplied and which collected liquid portion is discharged from the device 44 into the receptacle 61 simultaneous with the discharge of the liquid from the container 10. This collecting of small quantities or samples of liquid, such as milk, is for subsequent use in analyzing the milk for grading purposes in which daily samples from the same dairy may be collected for about ten days in order to provide a composite of the collected samples for acquiring a grade average.

In order to prevent too great a force of air pressure into the container 10 through the pipe line 66 when the control valve 72 is operated, the partition 77 in the T-fitting 75 having the reduced opening or aperture 78 is provided. This reduced opening permits a gradual building up of the pressure on the liquid in the container 10 which is to be discharged so that the sediment which may be contained in the liquid can be captured by the disc A and not forced through the disc as it would be in the event that too great an inrush of air was entrained on the liquid.

As the dwelling time length of the cam surface 72a on the valve stem 81 of the control valve 72 is limited, it may be that the sediment content is so great that sufficient air pressure for forcing the liquid through the test disc A, was not applied to the liquid drawn into the container 10, during a particular operation. Under a circumstance of this character, the valve 76 in the pipe 74 is hand operated to open position so that sufficient air pressure from the supply pipe 69 can be admitted to the pipe line 66, to force the heavy sediment ladened liquid from the container 10, through the test disc, and after which the valve 76 is closed.

In some instances where milk is being tested it is found that the milk is so thick in sediment content that all of the milk in the container 10 cannot be forced through the collecting disc A and in this event, a by-pass structure is provided which comprises a hand operated angle valve 31 having communication with the interior of the spout 26 and the hose length 32 connected to the branch 33 of the nozzle 34. For discharging the sediment ladened milk left in the container 10, the valve 31 is operated and the liquid is permitted to be entrained through the hose length 32 into the nozzle 34 from where it is discharged through the hose length 33 and returned to the receptacle 40.

In the event that it is only required to acquire samples of the liquid or milk by the use of the collecting or retaining device 44, a perforated gasket or apertured gasket washer is mounted on the perforated disc 37 instead of the collecting disc A and the container 10 is held in lowered position with the nozzle 26 tightly engaging the interposed gasket by the latch 19 engaging the bar 21 and the apparatus is operated in the same manner as heretofore with respect to the revolving member 82 and the cam surfaces thereon engaging respective control valves 68, 70 and 72, for entraining the liquid into the container 10 and subsequently discharging it through the interposed apertured gasket, direct to the receptacle 40. Also the liquid collected in the device 44 will of course be discharged therefrom as heretofore and at the time that discharge is made of the liquid in the container 10, and liquid collected in the device 44 will obviously be discharged therefrom by gravity into the receptacle 61 for sampling purposes.

With further regard to the retaining receptacle or device 44, the vertical member 48 thereof provides a baffling effect on the liquid entrained therein, as it is drawn through the supply line 43, this baffling effect on the liquid, disturbing and ridding the device 44 of the remains, if any, of a previous liquid content and carrying such liquid to the place of discharge or overflow through the container 10.

This method or manner of operation of the invention for sampling purposes is brought about by disposing the container 10 in an intermediate position between the vacuum forming means of the pipe line 66 and the liquid sampling receiving device 44 in the pipe line 66, so that the container 10 will receive the first surge or overflow of liquid from the receptacle 40 from which the sample is to be taken, the container 10 therefore trapping and preventing liquid reaching the vacuum forming means by reason of the predetermined time length of dwell or engagement of the cam surfaces 68a and 70a required to draw in a limited quantity of liquid in the container 10.

While one illustrative embodiment of the invention has been described in detail, it is not my intention to limit its scope to that particular embodiment or otherwise than by the terms of the appended claims.

What I claim is:

1. A device for catching liquid samples comprising a suction conduit, a container disposed in said conduit and forming a part thereof, said container having a discharge passageway at its lower end, a gravity actuated valve cooperable to close the passageway when liquid is being entrained through said conduit, means for intermittently entraining liquid through the conduit, and check valve controlled overflow means disposed in said conduit between the container and the liquid entraining means.

2. A device for catching liquid samples comprising a container having a comparably large discharge passageway for providing rapid and complete discharge of the liquid drawn into the container, a gravity actuated valve cooperable to close the passageway when liquid is being entrained into the container, means having cooperable relation with the container for intermittently entraining liquid therein, and cooperable overflow discharging means located between the container and said liquid entraining means.

3. A device for catching liquid samples comprising a container having a relatively large passageway comparable with the size of the container for providing rapid and complete discharge of liquid from the container, an inlet through which liquid is entrained to the container, a gravity actuated valve cooperable to close the passageway when liquid is entrained through the inlet, means having cooperable relation with the container for intermittently entraining liquid therein through the inlet thereof, and cooperable overflow means intermediately disposed between the liquid entraining means and said container.

4. An apparatus for catching liquid samples comprising a suction conduit, a catching receptacle disposed in said conduit and forming a part thereof, means having cooperable relation with said conduit for intermittently entraining liquid therethrough, and cooperable overflow means intermediately disposed between the liquid entraining means and said receptacle, said receptacle having a discharge opening and a gravity actuated valve cooperable to close said discharge opening when liquid is entrained through said conduit.

5. An apparatus for catching liquid samples comprising a container in communication with a body of liquid to be sampled and having a discharge passageway at its lower end and a gravity actuated valve cooperable with the passageway, intermittently operated vacuum forming means cooperable with the container to draw liquid from said body to said container, and cooperable overflow means intermediately disposed between said container and said vacuum forming means.

NICOLAS FERRAEZ, Jr.